(12) United States Patent
Jung

(10) Patent No.: US 7,205,076 B2
(45) Date of Patent: Apr. 17, 2007

(54) MASK FOR LASER IRRADIATION AND APPARATUS FOR LASER CRYSTALLIZATION USING THE SAME

(75) Inventor: Yun-Ho Jung, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 244 days.

(21) Appl. No.: 10/705,891

(22) Filed: Nov. 13, 2003

(65) Prior Publication Data
US 2004/0096754 A1 May 20, 2004

(30) Foreign Application Priority Data
Nov. 18, 2002 (KR) ................ 10-2002-0071704

(51) Int. Cl.
*G03F 1/00* (2006.01)
(52) U.S. Cl. .......................................... 430/5

(58) Field of Classification Search ............... 430/5; 438/584; 359/618
See application file for complete search history.

(56) References Cited

U.S. PATENT DOCUMENTS 5,387,484 A * 2/1995 Doany et al. ............... 430/5
5,609,977 A * 3/1997 Iwamatsu et al. ........... 430/5

* cited by examiner

*Primary Examiner*—S. Rosasco
(74) *Attorney, Agent, or Firm*—McKenna Long & Aldridge LLP

(57) ABSTRACT

A laser beam mask for shaping a laser beam includes a base substrate having first and second surfaces and having at least one first open portion, and a reflecting layer on the first surface of the base substrate, wherein the reflecting layer has at least one second open portion corresponding to the at least one first open portion and totally reflects the laser beam.

24 Claims, 17 Drawing Sheets irradiation direction of laser beam irradiation direction of laser beam irradiation direction of laser beam

MASK FOR LASER IRRADIATION AND APPARATUS FOR LASER CRYSTALLIZATION USING THE SAME

The present invention claims the benefit of Korean Patent Application No. 2002-71704, filed in Korea on Nov. 18, 2002, which is hereby incorporated by reference.

BACKGROUND OF THE INVENTION

1. Field of the Invention

The present invention relates to a mask for laser irradiation, and more particularly, to a mask for a crystallization process of an amorphous silicon thin film using a sequential lateral solidification, and an apparatus for laser crystallization using the same.

2. Discussion of the Related Art

A sequential lateral solidification (SLS) method is commonly applied to laser crystallization processes, which is one method of crystallizing amorphous silicon thin films into polycrystalline silicon thin films. The SLS method makes use of the fact that silicon grains tend to grow laterally from interfaces between liquid and solid phases of silicon such that grain boundaries are formed perpendicular to the interfaces.

The laser crystallization processes using the SLS method include the follow steps. First, an amorphous silicon thin film is irradiated with a laser beam having a predetermined shape, wherein the laser beam has a sufficient energy to completely melt the amorphous silicon thin film. Then, portions of the amorphous silicon thin film completely melted using the laser beam immediately solidify. After the irradiation step, the amorphous silicon instantaneously comprises a liquid phase within the portions irradiated with the laser beam and a solid phase within other portions not irradiated with the laser beam. Thus, interfaces are generated between the liquid and solid phases. Furthermore, silicon grains laterally grow from the interfaces between the liquid and solid phases during solidification.

Next, after moving the amorphous silicon thin film by a specific distance, the amorphous silicon is irradiated for a second time with the laser beam. Similarly, portions of the amorphous silicon thin film irradiated with the laser beam completely melt, and then the silicon grains laterally grow. Since the silicon grains formed through the first irradiation step function as crystallization seeds at the interfaces, the silicon grains grow along a scanning direction of the laser beam. These process steps are repeated until a desired area of the amorphous silicon thin film is crystallized. Accordingly, grain sizes of the polycrystalline silicon thin film are remarkably enlarged by the SLS method. In addition, the laser crystallization processes using the SLS method includes shaping the laser beam to have a specific width and a specific height. For this purpose, an apparatus for the laser crystallization processes using the SLS method use a mask for shaping the laser beam.

FIG. 1 is a schematic arrangement of an apparatus for laser crystallization processes using an SLS method according to the related art. In FIG. 1, an apparatus for laser crystallization processes using an SLS method includes a laser beam source 10, an attenuator 11, a homogenizer 12, a field lens 13, a laser beam mask 14, an object lens 15, first, second, and third mirrors 19a, 19b, and 19c to adjust a path of the laser beam, and a process chamber 20 having a translation stage 16. An initial laser beam emitted from the laser beam source 10 without treatment is transmitted through the attenuator 11 for adjusting the intensity of the laser beam, and through the homogenizer 12 and the field lens 13 to adjust intensity and uniformity of the laser beam. The laser beam transmitted through the field lens 13 is shaped to have a specific configuration while passing through the laser beam mask 14. Then, the shaped laser beam is transmitted through the object lens 15 for focusing the laser beam, and is irradiated onto a silicon thin film 17 disposed on the translation stage 16. In general, the silicon thin film is formed on a substrate in a liquid crystal display (LCD) device.

FIG. 2A is a schematic plan view of laser beam mask for laser crystallization processes using an SLS method according to the related art, and FIG. 2B is a schematic cross sectional view along II—II of FIG. 2A according to the related art. In FIGS. 2A and 2B, a laser beam shielding pattern 34 including a slit 32 is formed on one surface of a base substrate 30. Accordingly, a laser beam passes through the slit 32 from the other surface of the base substrate 30 during a laser crystallization process.

FIG. 3A is a schematic plan view of a laser beam mask for laser crystallization processes using an SLS method according to the related art, and FIG. 3B is a schematic cross sectional view along III—III of FIG. 3A according to the related art. In FIGS. 3A and 3B, a laser beam shielding pattern 44 including a slit 42 is formed on one surface of a base substrate 40 and an anti-reflecting layer 46 is formed on the other surface of the base substrate 40. Accordingly, a laser beam passes through the slit 42 from the other surface of the base substrate 40 during a laser crystallization process. Thus, reflection of the laser beam at the other surface of the base substrate 40 is minimized by the anti-reflecting layer 46.

In general, the laser beam shielding patterns 34 and 44 (in FIGS. 2A, 2B, 3A, and 3B) are each made of an opaque metallic material, such as chromium (Cr) and aluminum (Al). Furthermore, the anti-reflecting layer 46 (in FIGS. 3A and 3B) reduces reflectance of the laser beam and is formed through a coating method using an organic material as a target. During a laser crystallization process using the laser beam masks of FIGS. 2A, 2B, 3A, and 3B, some of the laser beam is transmitted through the slit 32 and 42 (in FIGS. 2A, 2B, 3A, and 3B) and other portions of the laser beam are absorbed into the laser beam shielding pattern 34 and 44 (in FIGS. 2A, 2B, 3A, and 3B). Accordingly, the absorption of the laser beam may cause some damage to the laser beam shielding pattern 34 and 44 (in FIGS. 2A, 2B, 3A, and 3B). For example, the opaque metallic material of the laser beam shielding pattern 34 and 44 (in FIGS. 2A, 2B, 3A, and 3B) may be thermally oxidized due to high intensity of the laser beam. When the thermal oxidization of the opaque metallic material is severe, the opaque metallic material may be converted and removed into particles. These particles may be attached within the slit 32 and 42 (in FIGS. 2A, 2B, 3A, and 3B), thereby reducing the intensity and/or the uniformity of the laser beam. Accordingly, frequent maintenance, such as cleaning, of the laser beam mask and changing of gases for the laser source is necessary, thereby reducing process yield. Moreover, as intensity and repetition rate of the laser beam increases, the damage of the laser beam mask and reduction of the process yield increases.

SUMMARY OF THE INVENTION

Accordingly, the present invention is directed to a mask for laser irradiation and an apparatus for laser crystallization using the same that substantially obviate one or more of the problems due to limitations and disadvantages of the related art.

An object of the present invention is to provide a mask for laser irradiation that prevents damage of the mask by totally reflecting a laser beam, and an apparatus for laser crystallization using the same.

Another object of the present invention is to provide a mask for laser irradiation having an improved process yield by increasing intensity and repetition rate of a laser beam without causing damage to the mask.

Another object of the present invention is to provide a mask for laser irradiation that may be applied to an apparatus for crystallization using high intensity laser beam.

Another object of the present invention is to provide a mask for laser irradiation having a dielectric layer treated by a mirror coating method to totally reflect a laser beam.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a laser beam mask for shaping a laser beam includes a base substrate having first and second surfaces and having at least one first open portion, and a reflecting layer on the first surface of the base substrate, wherein the reflecting layer has at least one second open portion corresponding to the at least one first open portion and totally reflects the laser beam.

In another aspect, a laser beam mask for shaping a laser beam includes a base substrate having first and second surfaces, and a reflecting layer on the first surface of the base substrate, wherein the reflecting layer has at least one first open portion and totally reflects the laser beam.

In another aspect, an apparatus for crystallization of an amorphous silicon thin film includes a laser beam source emitting a laser beam, an attenuator adjusting an intensity of the laser beam, a homogenizer adjusting uniformity of the laser beam, a mask including: a base substrate having first and second surfaces; and a reflecting layer on the first surface of the base substrate, wherein the reflecting layer has at least one first open portion and totally reflects the laser beam, and a translation stage which the amorphous silicon thin film is loaded on.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
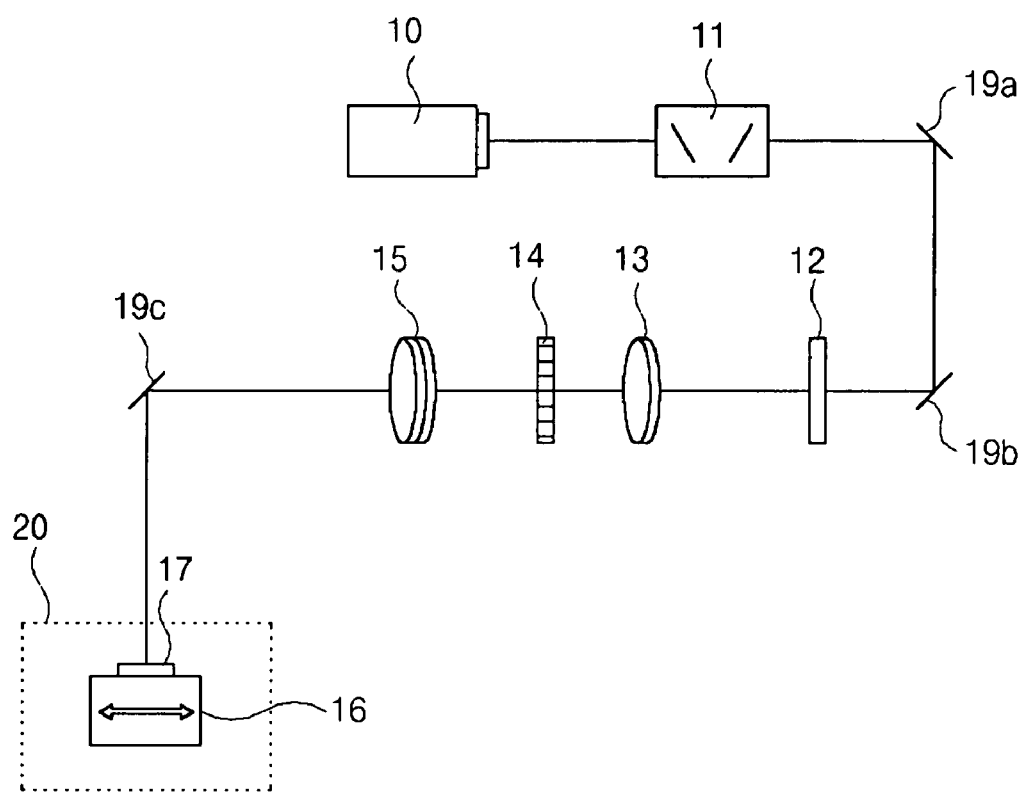
FIG. 1 is a schematic arrangement of an apparatus for laser crystallization processes using an SLS method according to the related art.
Figure 2A:
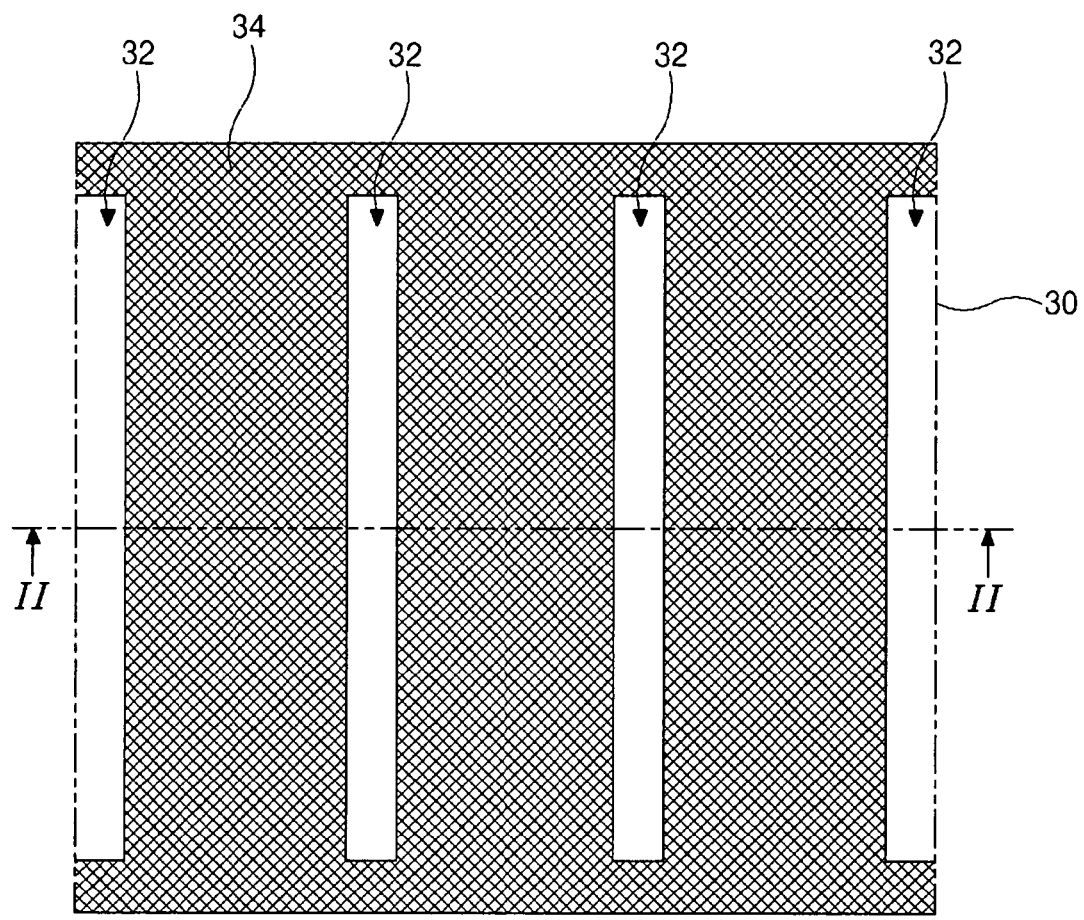
FIG. 2A is a schematic plan view of laser beam mask for laser crystallization processes using an SLS method according to the related art.
Figure 2B:
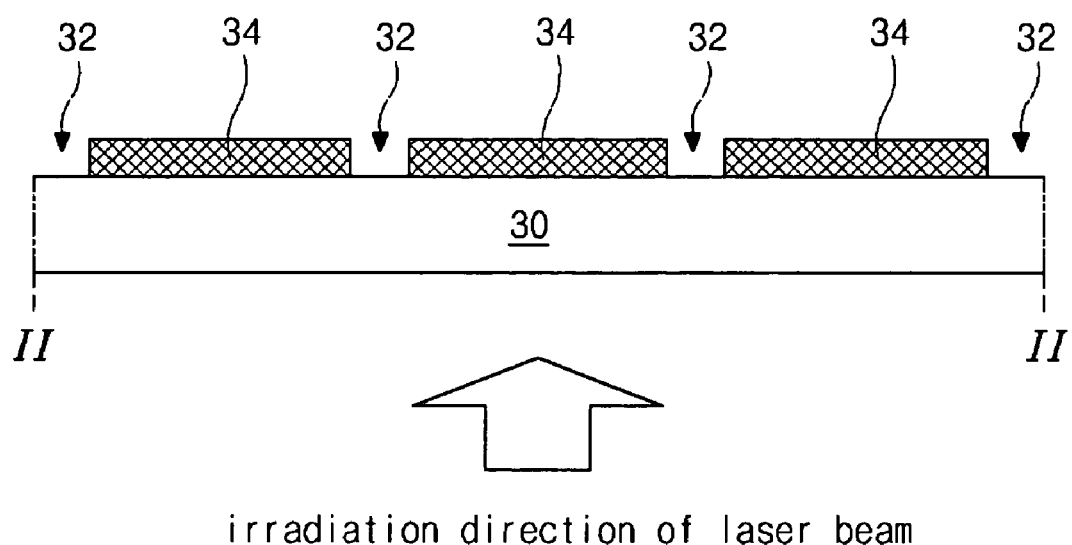
FIG. 2B is a schematic cross sectional view along II—II of FIG. 2A according to the related art.
Figure 3A:
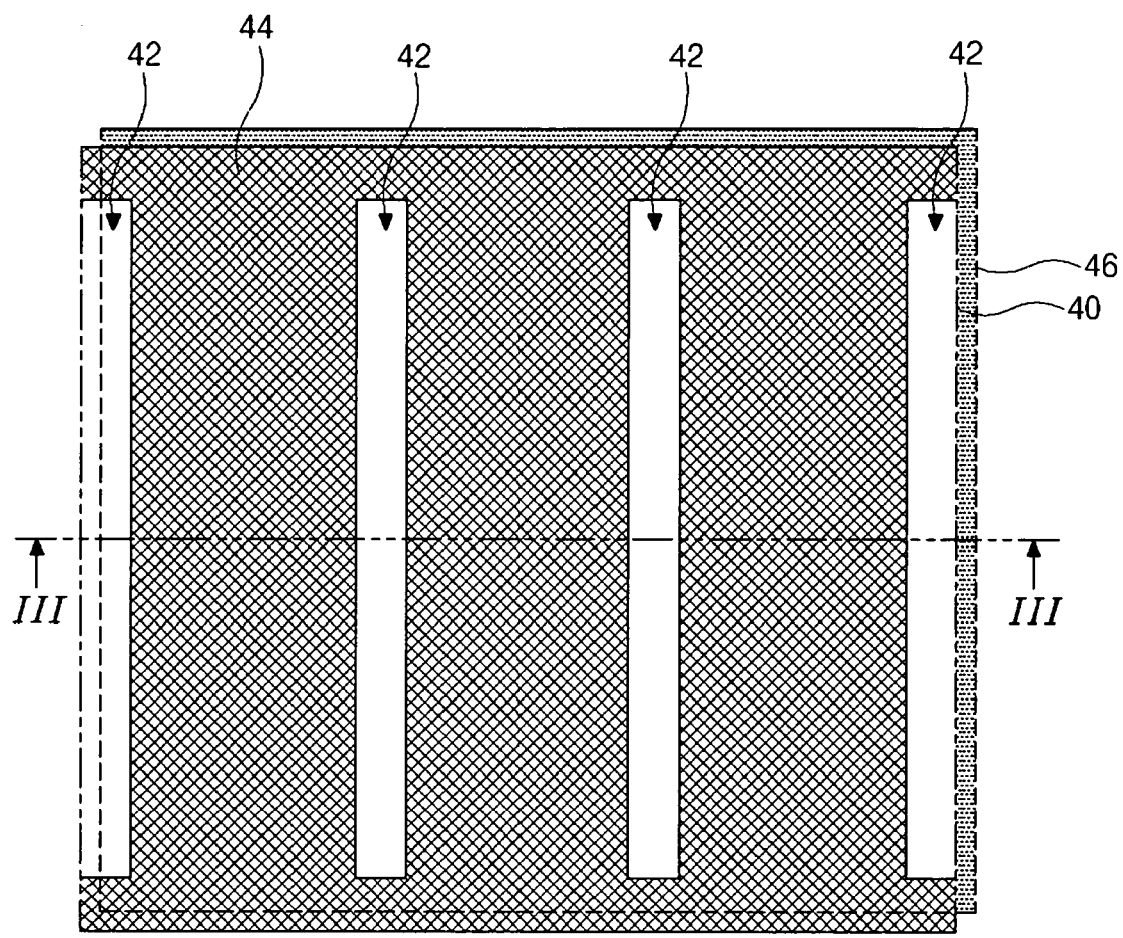
FIG. 3A is a schematic plan view of a laser beam mask for laser crystallization processes using an SLS method according to the related art.
Figure 3B:
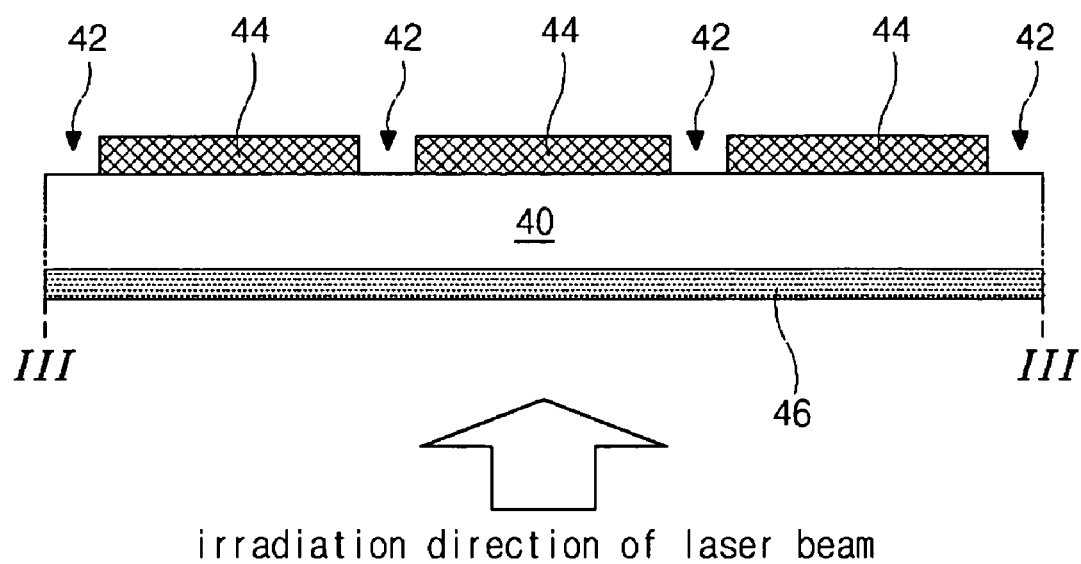
FIG. 3B is a schematic cross sectional view along III—III of FIG. 3A according to the related art.
Figure 4:
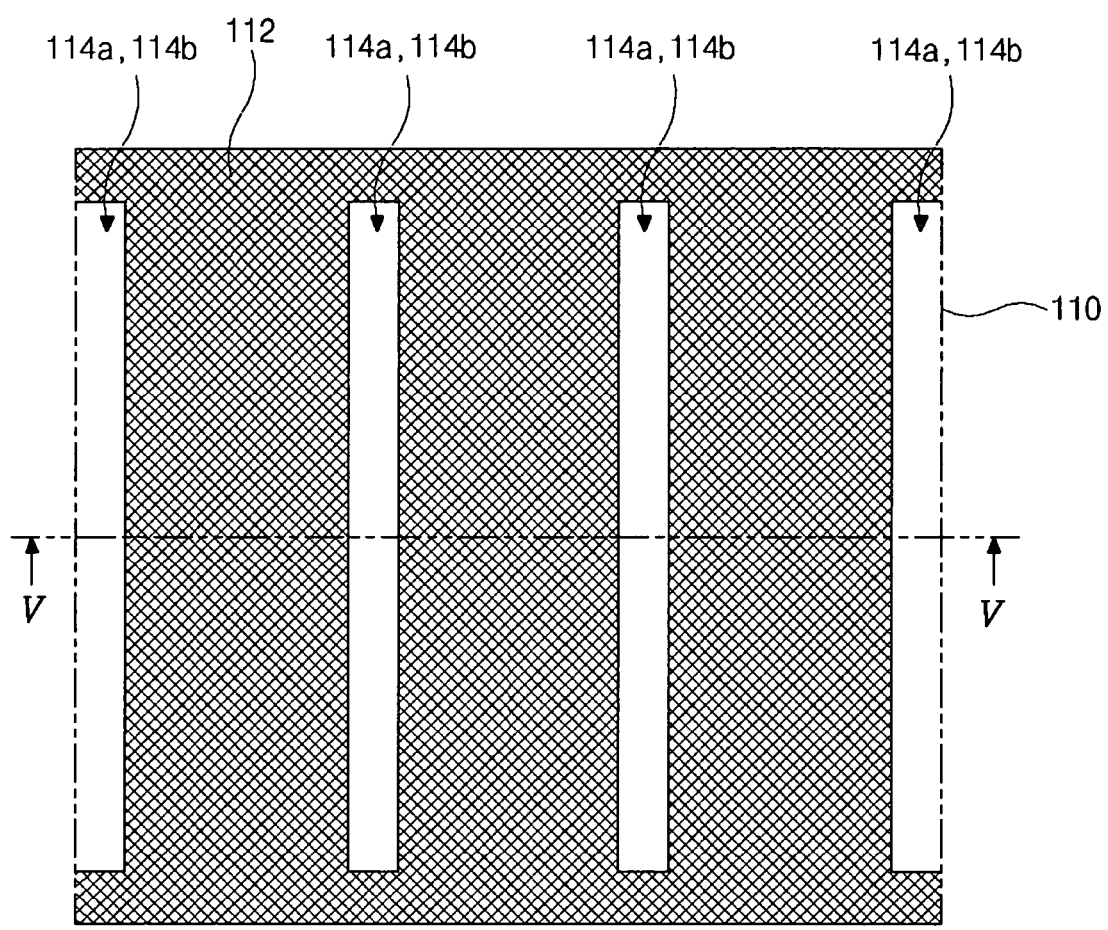
FIG. 4 is a schematic plan view of an exemplary mask for laser irradiation according to the present invention.
Figure 5:
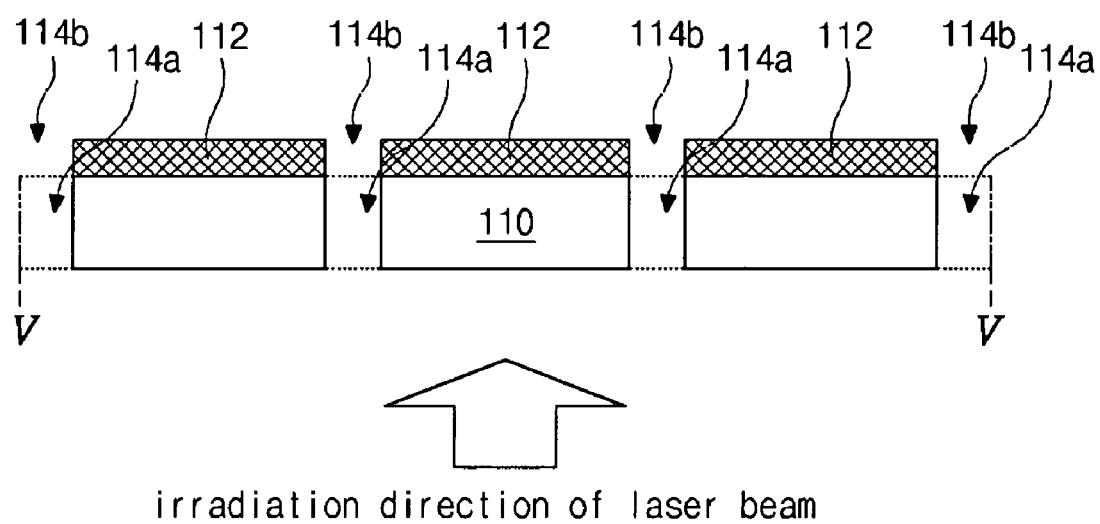
FIG. 5 is a cross sectional view along V—V of FIG. 4 according to the present invention.

FIG. 4 is a schematic plan view of an exemplary mask for laser irradiation according to the present invention, and FIG. 5 is a cross sectional view along V—V of FIG. 4 according to the present invention. In FIGS. 4 and 5, a base substrate 110 may have first and second surfaces, and a reflecting layer 112 may be formed on the first surface of the base substrate 110. The base substrate 110 may be formed of one of quartz, glass, and silicon, and the reflecting layer 112 may be formed of a dielectric material. The base substrate 110 may have at least one first open portion 114a, and the reflecting layer 112 may have at least one second open portion 114b corresponding to the at least one first open portion 114a. The at least one first open portion 114a may substantially have the same shape and position as the at least one second open portion 114b. For example, the first and second open portions 114a and 114b may have a shape of a micro-slit. In addition, the first and second open portions 114a and 114b may be separately formed or may be simultaneously formed after forming the reflecting layer 112.

In FIG. 5, a laser beam may be emitted from a laser beam source (not shown) outside of the second surface of the base substrate 110, and may be transmitted from the base substrate 110 to the reflecting layer 112 through the first and second open portions 114a and 114b. Furthermore, when the at least one first open portion 114a includes a plurality of first open portions, the plurality of first open portions may be spaced apart from each other. Similarly, when the at least one second open portion 114b includes a plurality of second open portions, the plurality of second open portions may be spaced apart from each other.

The reflecting layer 112 may totally reflect a laser beam, and may be formed using a mirror coating method having a dielectric material. During the mirror coating method, a refractive index and a thickness of the reflecting layer 112 may be calculated so that the reflecting layer 112 totally reflects a laser beam. In addition, the dielectric material may be selected according to the calculated refractive index, and coating conditions, such as coating rate and coating time, may be determined according to the calculated thickness.

The mask according to FIGS. 4 and 5 may be applied to a laser crystallization process using a high energy density laser beam. For example, a mask of the present invention may be applied to an apparatus using an object lens having a reduction ratio of 1:1. In addition, energy efficiency of a laser beam is improved.

Figure 6:
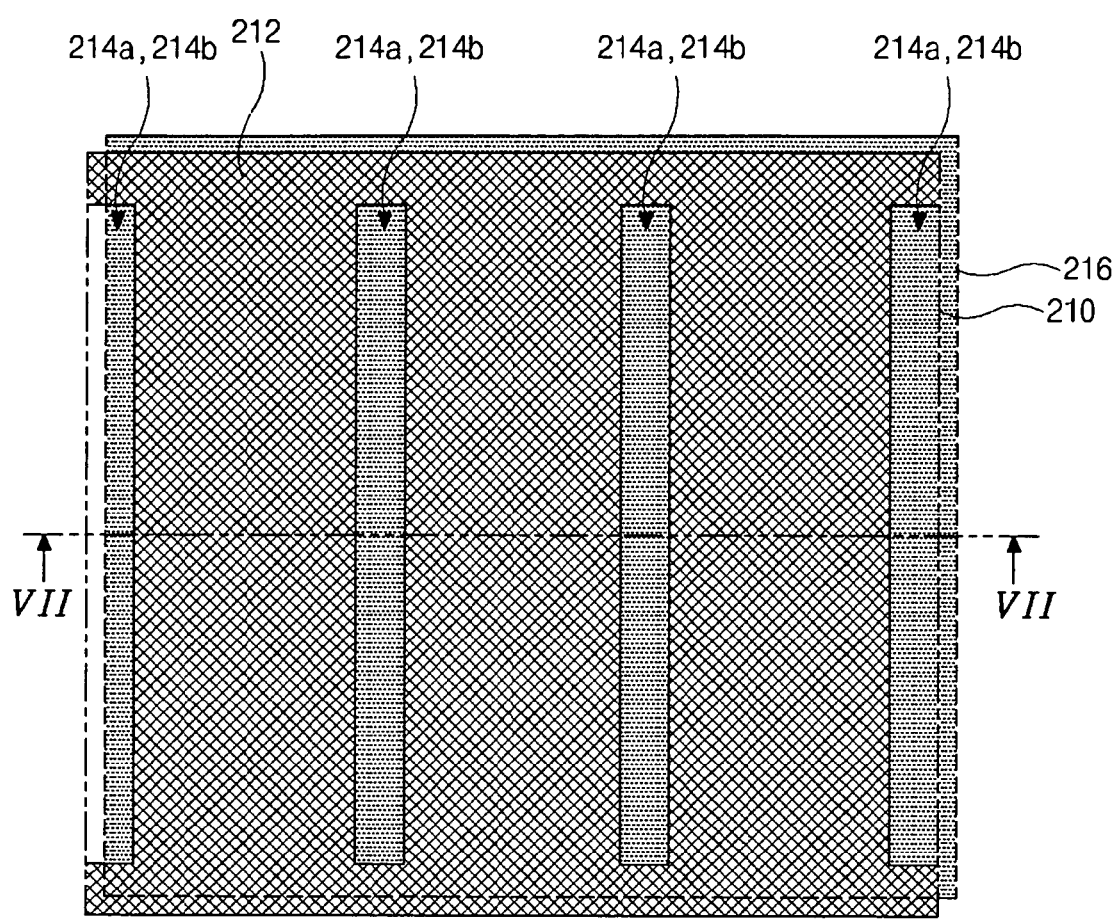
FIG. 6 is a schematic plan view of another exemplary mask for laser irradiation according to the present invention.
Figure 7:
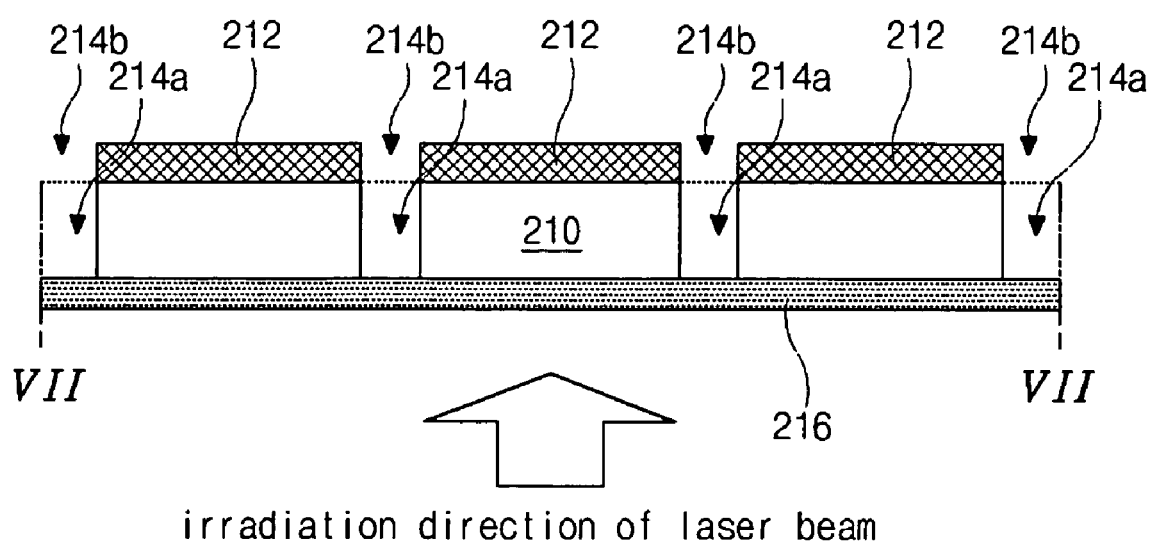
FIG. 7 is a cross sectional view along VII—VII of FIG. 6 according to the present invention.

FIG. 6 is a schematic plan view of another exemplary mask for laser irradiation according to the present invention, and FIG. 7 is a cross sectional view along VII—VII of FIG. 6 according to the present invention. In FIGS. 6 and 7, a base substrate 210 may include first and second surfaces, and a reflecting layer 212 may be formed on the first surface of the base substrate 210. The base substrate 210 may be formed of one of quartz, glass, and silicon, and the reflecting layer 212 may be formed of a dielectric material. The base substrate 210 may have at least one first open portion 214a, and the reflecting layer 212 may have at least one second open portion 214b corresponding to the at least one first open portion 214a. The at least one first open portion 214a may substantially have the same shape and position as the at least one second open portion 214b. For example, the first and second open portions 214a and 214b may have a shape of a micro-slit.

In addition, an anti-reflecting layer 216 may be formed on the second surface of the base substrate 210, and may be formed through an anti-reflecting coating method using an organic material. A laser beam may be emitted from a laser beam source (not shown) outside of the anti-reflecting layer 216, and may pass through the anti-reflecting layer 216. When the laser beam is incident on the anti-reflecting layer 216, the anti-reflecting layer 216 may minimize reflectance of the laser beam. For example, the laser beam may be transmitted from the base substrate 210 to the reflecting layer 212 through the first and second open portions 214a and 214b. Furthermore, when the at least one first open portion 214a includes a plurality of first open portions, the plurality of first open portions may be spaced apart from each other. Similarly, when the at least one second open portion 214b includes a plurality of second open portions, the plurality of second open portions may be spaced apart from each other. Although not shown, the anti-reflecting layer 216 may have at least one third open portions corresponding to the at least one first open portions 214a. The first, second, and third open portions may be separately formed or may be simultaneously formed after forming the reflecting layer 212 and the anti-reflecting layer 216.

Since the reflecting layer 212 may totally reflect the laser beam, it may be formed using a mirror coating method having a dielectric material. During the mirror coating method, a refractive index and a thickness of the reflecting layer 212 may be calculated so that the reflecting layer 212 totally reflects a laser beam. In addition, the dielectric material may be selected according to the calculated refractive index, and coating conditions, such as coating rate and coating time, may be determined according to the calculated thickness.

According to the present invention, since the reflecting layer 212 may not absorb but totally reflect the laser beam, thermal oxidation of the reflecting layer 212 and particle generation may be reduced. Moreover, even when a few particles are generated, the particles may not become attached onto the base substrate 210 due to the at least one first open portion 214a. Furthermore, since the anti-reflecting layer 216 may minimize reflectance of the laser beam, transmittance of the laser beam through the base substrate 210 may be improved. As a result, the mask of FIGS. 6 and 7 may be applied to a laser crystallization process using a high energy density laser beam, thereby improving energy efficiency of the laser beam.

Figure 8:
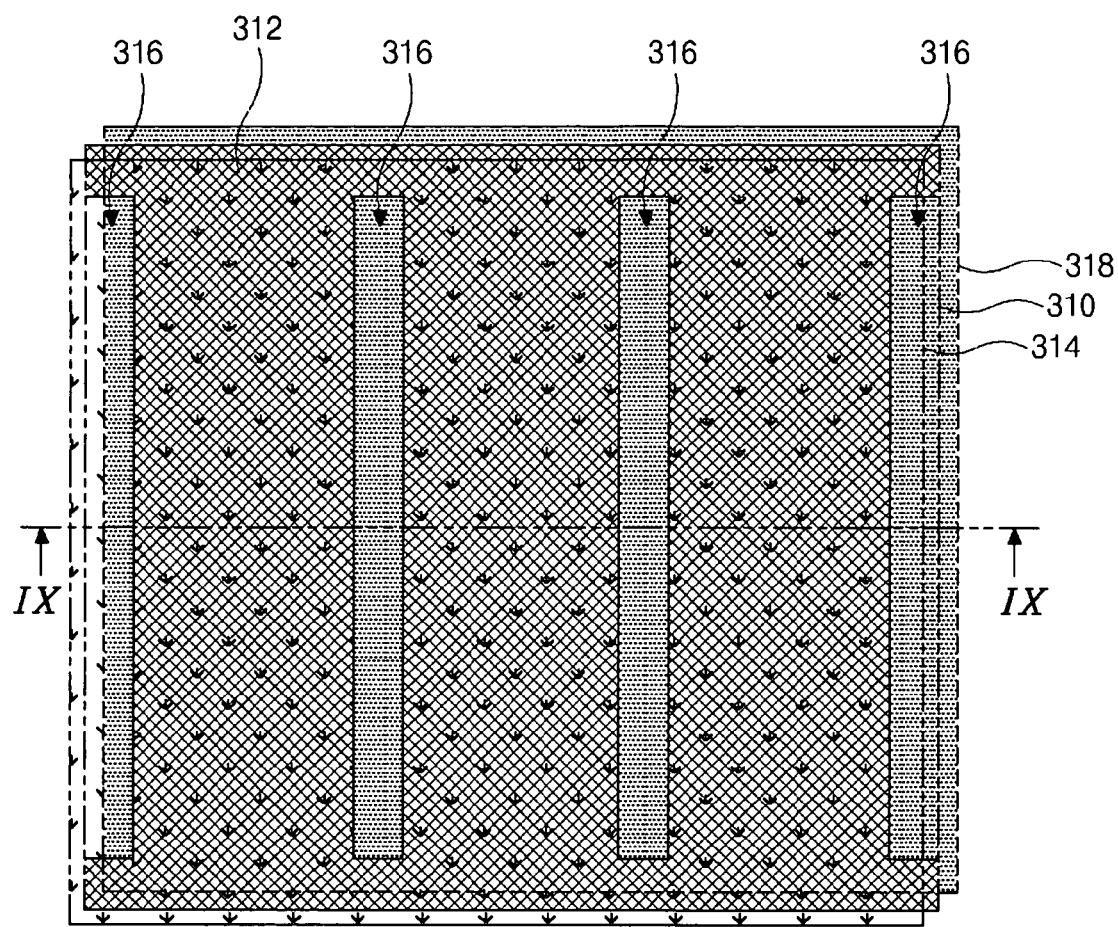
FIG. 8 is a schematic plan view of another exemplary mask for laser irradiation according to the present invention.
Figure 9:
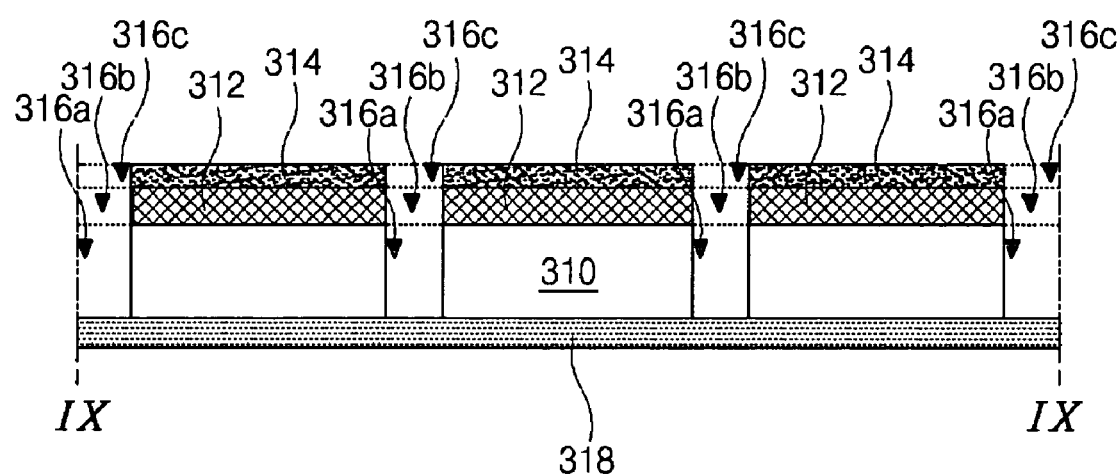
FIG. 9 is a cross sectional view along IX—IX of FIG. 8 according to the present invention.

FIG. 8 is a schematic plan view of another exemplary mask for laser irradiation according to the present invention, and FIG. 9 is a cross sectional view along IX—IX of FIG. 8 according to the present invention. In FIGS. 8 and 9, a base substrate 310 may include first and second surfaces, and a reflecting layer 312 may be formed on the first surface of the base substrate 310. The base substrate 310 may be formed of one of quartz, glass, and silicon, and the reflecting layer 312 may be formed of a dielectric material. The base substrate 310 may include at least one first open portion 316a, and the reflecting layer 312 may include at least one second open portion 316b corresponding to the at least one first open portion 316a. In addition, a first anti-reflecting layer 314 may be formed on the reflecting layer 312 to provide protection of the reflecting layer 312. The first anti-reflecting layer 314 may have at least one third open portion 316c corresponding to the at least one first open portion 316a, wherein first, second, and third open portions 316a, 316a, and 316c may substantially have the same shape and positions relative to each other. For example, the first, second, and third open portions 316a, 316b, and 316c may have a shape of a micro-slit. In addition, a second anti-reflecting layer 318 may be formed on the second surface of the base substrate 310, wherein the first and second anti-reflecting layers 314 and 318 may be formed using an anti-reflecting coating method having an organic material.

According to the present invention, a laser beam may be emitted from a laser beam source (not shown) outside of the second anti-reflecting layer 318, and may pass through the second anti-reflecting layer 318. When the laser beam meets the second anti-reflecting layer 318, the anti-reflecting layer 318 may minimize reflectance at the second surface of the base substrate 310. Accordingly, the laser beam may be transmitted from the base substrate 310 to the first anti-reflecting layer 314 through the first to third open portions 316a to 316c. When the laser beam transmitted by the mask is irradiated onto an amorphous silicon thin film (not shown), some of the laser beam may reflect from the amorphous silicon thin film and return to the mask. If the returned laser beam reflects from the mask, the reflected laser beam may be again irradiated onto the amorphous silicon layer. Accordingly, the total energy of the irradiated laser beam may be different from a predetermined value and uniformity may be reduced. In addition, the first anti-reflecting layer 314 may prevent the reflectance of the returned laser beam from the mask, thereby improving total energy density and uniformity of the laser beam.

In FIGS. 8 and 9, when the at least one first open portion 316a includes a plurality of first open portions, the plurality of first open portions may be spaced apart from each other. Similarly, when the second and third open portions 316b and 316c include a plurality of second open portions and a plurality of third open portions, respectively, the second and third open portions may be spaced apart from each other.

Although not shown, the anti-reflecting layer 318 may have at least one fourth open portions corresponding to the at least one first open portion 316a. Accordingly, the first, second, third, and fourth open portions may be separately formed or may be simultaneously formed after forming the reflecting layer 312 and the first and second anti-reflecting layers 314 and 318.

In FIG. 9, the reflecting layer 312 may totally reflect a laser beam. The reflecting layer 312 may be formed using a mirror coating method having a dielectric material. During the mirror coating method, a refractive index and a thickness of the reflecting layer 312 may be calculated so that the reflecting layer 312 may totally reflect a laser beam. In addition, the dielectric material may be selected according to the calculated refractive index, and coating conditions, such as coating rate and coating time, may be determined according to the calculated thickness.

According to the present invention, since the reflecting layer 312 may not absorb but totally reflect a laser beam, thermal oxidation of the reflecting layer 312 and particle generation may be reduced. Moreover, even when a few particles are generated, the particles may not become attached onto the base substrate 310 due to the at least one first open portion 316a. Furthermore, the first and second anti-reflecting layers 314 and 318 may minimize reflectance of a laser beam, thereby improving transmittance of a laser beam through the base substrate 310. As a result, the exemplary mask of FIGS. 8 and 9 may be applied to a laser crystallization process using a high energy density laser beam, thereby improving energy efficiency and uniformity of a laser beam.

Figure 10:
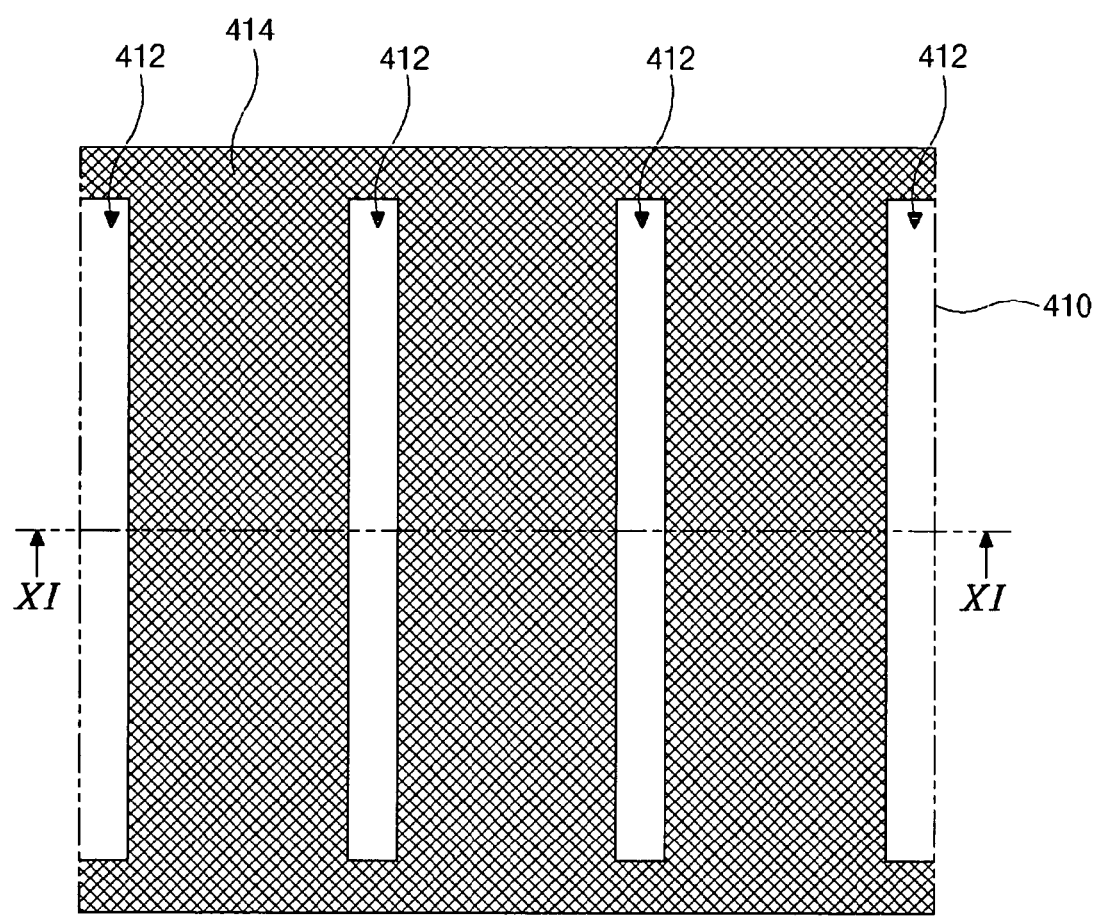
FIG. 10 is a schematic plan view of another exemplary mask for laser irradiation according to the present invention.
Figure 11:
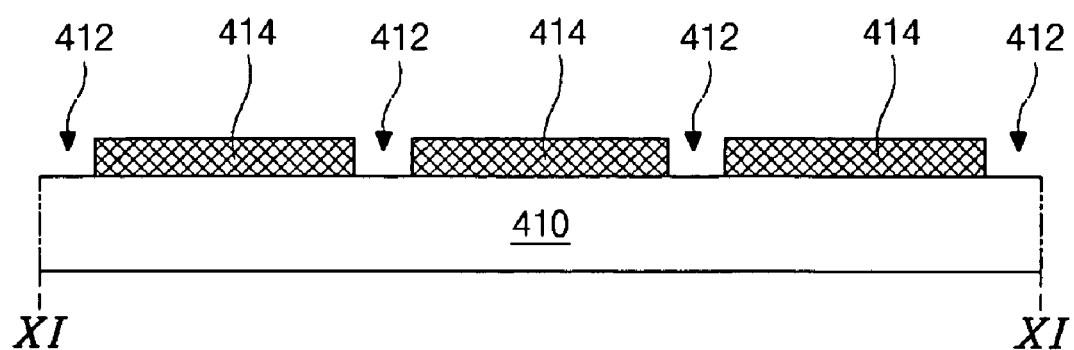
FIG. 11 is a cross sectional view along XI—XI of FIG. 10 according to the present invention.

FIG. 10 is a schematic plan view of another exemplary mask for laser irradiation according to the present invention, and FIG. 11 is a cross sectional view along XI—XI of FIG. 10 according to the present invention. In FIGS. 10 and 11, a base substrate 410 may include first and second surfaces, and a reflecting layer 414 may be formed on the first surface of the base substrate 410. The base substrate 410 may be formed of one of quartz, glass, and silicon, and the reflecting layer 414 may be formed of a dielectric material and may include at least one first open portion 412. For example, the first open portion 412 may have a shape of a micro-slit. A laser beam may be emitted from a laser beam source (not shown) outside of the second surface of the base substrate 410, and may be transmitted from the base substrate 410 to the reflecting layer 414 through the at least one first open portion 412. Furthermore, when the at least one first open portion 412 includes a plurality of first open portions, the plurality of first open portions may be spaced apart from each other.

In FIG. 11, the reflecting layer 414 may totally reflect a laser beam, and may be formed using a mirror coating method having a dielectric material. During the mirror coating method, a refractive index and a thickness of the reflecting layer 414 may be calculated so that the reflecting layer 414 totally reflects a laser beam. In addition, the dielectric material may be selected according to the calculated refractive index, and coating conditions, such as coating rate and coating time, may be determined according to the calculated thickness.

According to the present invention, the reflecting layer 414 may not absorb but totally reflect a laser beam. Therefore, thermal oxidation of the reflecting layer 414 and particle generation may be reduced, and transmittance of a laser beam through the base substrate 410 may not be reduced. As a result, the exemplary mask of FIGS. 10 and 11 may be applied to a laser crystallization process using a high energy density laser beam, thereby improving energy efficiency of a laser beam.

Figure 12:
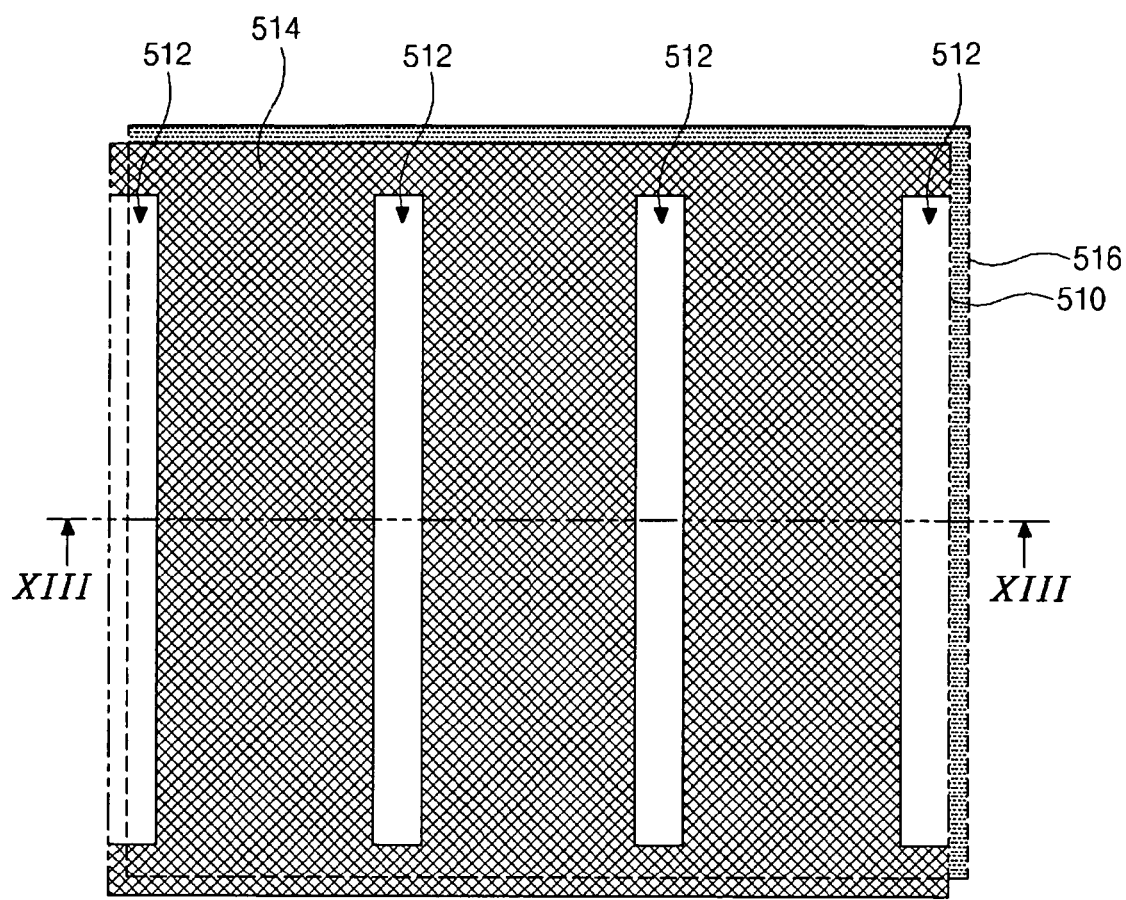
FIG. 12 is a schematic plan view of another exemplary mask for laser irradiation according to the present invention.
Figure 13:
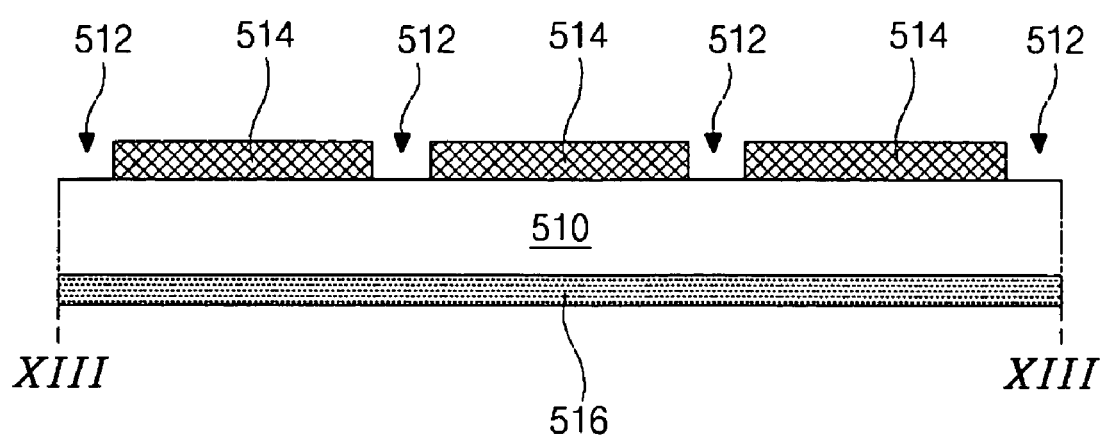
FIG. 13 is a cross sectional view along XIII—XIII of FIG. 12 according to the present invention.

FIG. 12 is a schematic plan view of another exemplary mask for laser irradiation according to the present invention, and FIG. 13 is a cross sectional view along XIII—XIII of FIG. 12 according to the present invention. In FIGS. 12 and 13, a base substrate 510 may include first and second surfaces, and a reflecting layer 514 may be formed on the first surface of the base substrate 510. The base substrate 510 may be formed of one of quartz, glass, and silicon, and the reflecting layer 514 may be formed of a dielectric material. The reflecting layer 514 may include at least one first open portion 512. For example, the at least first open portion 512 may have a shape of a micro-slit. In addition, an anti-reflecting layer 516 may be formed on the second surface of the base substrate 510, and may be formed using an anti-reflecting coating method having an organic material.

In FIG. 13, a laser beam may be emitted from a laser beam source (not shown) outside of the anti-reflecting layer 516, and may pass through the anti-reflecting layer 516. When the laser beam is incident to the anti-reflecting layer 516, the anti-reflecting layer 516 may minimize reflectance. The laser beam may be transmitted from the base substrate 510 to the reflecting layer 514 through the at least first open portion 512. When the at least one first open portion 512 includes a plurality of first open portions, the plurality of first open portions may be spaced apart from each other. Although not shown, the anti-reflecting layer 516 may have at least one second open portion corresponding to the at least one first open portion 512. The first and second open portions may be separately formed after forming the respective reflecting layer 514 and the anti-reflecting layer 516.

In FIG. 13, the reflecting layer 514 may totally reflect a laser beam. The reflecting layer 514 may be formed using a mirror coating method having a dielectric material. During the mirror coating method, a refractive index and a thickness of the reflecting layer 514 may be calculated so that the reflecting layer 514 may totally reflect a laser beam. In addition, the dielectric material may be selected according to the calculated refractive index, and coating conditions, such as coating rate and coating time, may be determined according to the calculated thickness.

According to the present invention, since the reflecting layer 514 may not absorb but totally reflect a laser beam, thermal oxidation of the reflecting layer 514 and particle generation may be reduced. Furthermore, the anti-reflecting layer 516 may minimize reflectance of a laser beam and transmittance of a laser beam through the base substrate 510 may be improved. As a result, the exemplary mask of FIGS. 12 and 13 may be applied to a laser crystallization process using a high energy density laser beam, thereby improving an energy efficiency of a laser beam.

Figure 14:
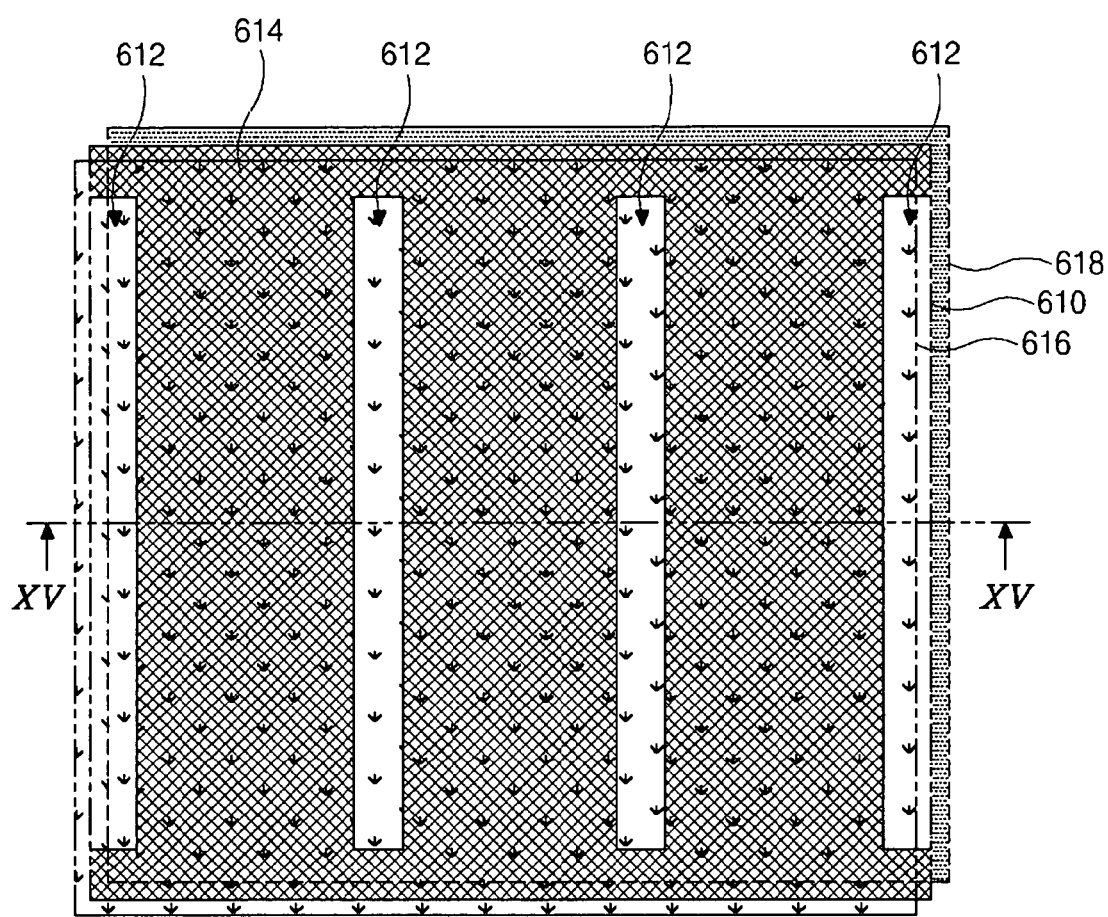
FIG. 14 is a schematic plan view of another exemplary mask for laser irradiation according to the present invention.
Figure 15:
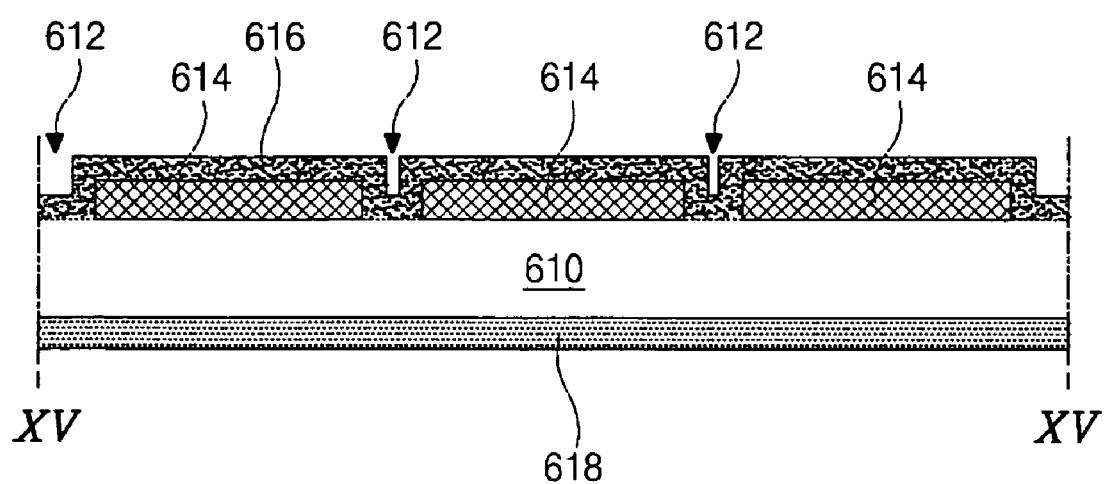
FIG. 15 is a cross sectional view along XV—XV of FIG. 14 according to the present invention.

FIG. 14 is a schematic plan view of another exemplary mask for laser irradiation according to the present invention, and FIG. 15 is a cross sectional view along XV—XV of FIG. 14 according to the present invention. In FIGS. 14 and 15, a base substrate 610 may include first and second surfaces, and a reflecting layer 614 may be formed on the first surface of the base substrate 610. The base substrate 610 may be formed of one of quartz, glass, and silicon, and the reflecting layer 614 may be formed of a dielectric material. The reflecting layer 614 may include at least one first open portion 612. In addition, a first anti-reflecting layer 616 may be formed on the reflecting layer 614 to provide protection of the reflecting layer 614. Although not shown, the first anti-reflecting layer 616 may have at least one second open portion corresponding to the at least one first open portion 612. The first open portion 612 and the second open portion (not shown) may substantially have the same shape and position as each other. For example, the first open portion 612 and the second open portion (not shown) may have a shape of a micro-slit. The first open portion 612 and the second open portion (not shown) may be formed separately or may be simultaneously formed after forming the first anti-reflecting layer 616. When the at least one first open portion 612 includes a plurality of first open portions, the plurality of first open portions may be spaced apart from each other. In addition, a second anti-reflecting layer 618 may be formed on the second surface of the base substrate 610. The first and second anti-reflecting layers 616 and 618 may be formed using an anti-reflecting coating method having an organic material. Although not shown, the second anti-reflecting layer 618 may have at least one third open portion corresponding to the at least one first open portion 612.

In FIG. 15, a laser beam may be emitted from a laser beam source (not shown) outside of the second anti-reflecting layer 618, and may pass through the second anti-reflecting layer 618. When the laser beam is incident to the second anti-reflecting layer 618, the anti-reflecting layer 618 may minimize reflectance at the second surface of the base substrate 610. The laser beam may be transmitted from the base substrate 610 to the first anti-reflecting layer 616 through the at least one first open portion 612. When the laser beam transmitted by the mask is irradiated onto an amorphous silicon thin film (not shown), some of the laser beam may be reflected from the amorphous silicon thin film and return to the mask. If the returned laser beam reflects from the mask, the reflected laser beam may be again irradiated onto the amorphous silicon layer. Accordingly, the total energy of the irradiated laser beam may be different from a predetermined value and uniformity may be reduced. The first anti-reflecting layer 616 prevents the reflectance of the returned laser beam from the mask, thereby total energy density and uniformity of the laser beam may be improved.

In FIG. 15, the reflecting layer 614 may totally reflect a laser beam. The reflecting layer 614 may be formed using a mirror coating method having a dielectric material. During the mirror coating method, a refractive index and a thickness of the reflecting layer 614 may be calculated so that the reflecting layer 614 may totally reflect a laser beam. In addition, the dielectric material may be selected according to the calculated refractive index, and coating conditions, such as coating rate and coating time, may be determined according to the calculated thickness.

According to the present invention, since the reflecting layer 614 may not absorb but totally reflect a laser beam, thermal oxidation of the reflecting layer 614 and particle generation may be reduced. Furthermore, the first and second anti-reflecting layers 616 and 618 may minimize reflectance of a laser beam, thereby improving transmittance of a laser beam through the base substrate 610. As a result, the exemplary mask of FIGS. 14 and 15 may be applied to a laser crystallization process using a high energy density laser beam, thereby improving energy efficiency and uniformity of a laser beam.

It will be apparent to those skilled in the art that various modifications and variations can be made in the mask for laser irradiation and the apparatus for laser crystallization using the same of the present invention without departing from the spirit or scope of the invention. Thus, it is intended that the present invention cover the modifications and variations of this invention provided they come within the scope of the appended claims and their equivalents.

What is claimed is:

1. A laser beam mask for shaping a laser beam, comprising:
    a base substrate having first and second surfaces and having at least one first open portion; and
    a reflecting layer on the first surface of the base substrate, wherein the reflecting layer has at least one second open portion corresponding to the at least one first open portion and has a refractive index and a thickness such that the reflecting layer totally reflects the laser beam.

2. The mask according to claim 1, wherein the laser beam is transmitted from the base substrate to the reflecting layer.

3. The mask according to claim 1, wherein the reflecting layer includes a dielectric material.

4. The mask according to claim 3, wherein the reflecting layer is formed using a mirror coating method for selecting a refractive index of the dielectric material and adjusting a thickness of the reflecting layer.

5. The mask according to claim 1, further comprising a first anti-reflecting layer formed on the second surface of the base substrate for minimizing reflectance of the laser beam.

6. The mask according to claim 5, wherein the first anti-reflecting layer has at least one third open portion corresponding to the at least one first open portion.

7. The mask according to claim 5, further comprising a second anti-reflective layer formed on the reflecting layer for minimizing reflectance of the laser beam.

8. The mask according to claim 7, wherein the second anti-reflective layer has at least one fourth open portion corresponding to the at least one first open portion.

9. The mask according to claim 7, wherein the first and second anti-reflecting layers include an organic material.

10. The mask according to claim 1, wherein the at least one first open portion substantially has a shape of slit.

11. The mask according to claim 1, wherein the laser beam mask includes one of quartz, glass and silicon.

12. A laser beam mask for shaping a laser beam, comprising:
    a base substrate having first and second surfaces and including at least an opening; and
    a reflecting layer on the first surface of the base substrate, wherein the reflecting layer has at least one first open portion wherein the first open portion has a shape substantially that of a micro-slit and has a refractive index and a thickness such that the reflecting layer totally reflects the laser beam.

13. The mask according to claim 12, wherein the laser beam is transmitted from the base substrate to the reflecting layer.

14. The mask according to claim 12, wherein the reflecting layer includes a dielectric material.

15. The mask according to claim 14, wherein the reflecting layer is formed through a mirror coating method for selecting a refractive index of the dielectric material and adjusting a thickness of the reflecting layer.

16. The mask according to claim 12, further comprising a first anti-reflecting layer formed on the second surface of the base substrate for minimizing reflectance of the laser beam.

17. The mask according to claim 16, wherein the first anti-reflecting layer has at least one second open portion corresponding to the at least one first open portion.

18. The mask according to claim 16, further comprising a second anti-reflective layer formed on the reflecting layer for minimizing reflectance of the laser beam.

19. The mask according to claim 18, wherein the second anti-reflective layer has at least one third open portion corresponding to the at least one first open portion.

20. The mask according to claim 18, wherein the first and second anti-reflecting layers include an organic material.

21. The mask according to claim 12, wherein the at least one first open portion substantially has a shape of slit.

22. The mask according to claim 12, wherein the laser beam mask includes one of quartz, glass and silicon.

23. An apparatus crystallization of an amorphous silicon thin film, comprising:
   a laser beam source emitting a laser beam;
   an attenuator adjusting an intensity of the laser beam;
   a homogenizer adjusting uniformity of the laser beam;
   a mask including:
   a base substrate having first and second surfaces and having at least one first oven portion; and
   a reflecting layer on the first surface of the base substrate, wherein the reflecting layer has at least one second open portion corresponding to the at least one first open portion and has a refractive index and a thickness such that the reflecting layer totally reflects the laser beam; and
   a translation stage which the amorphous silicon thin film is loaded on.

24. The apparatus according to claim 23, wherein the reflecting layer includes a dielectric material.

* * * * *